2,720,550

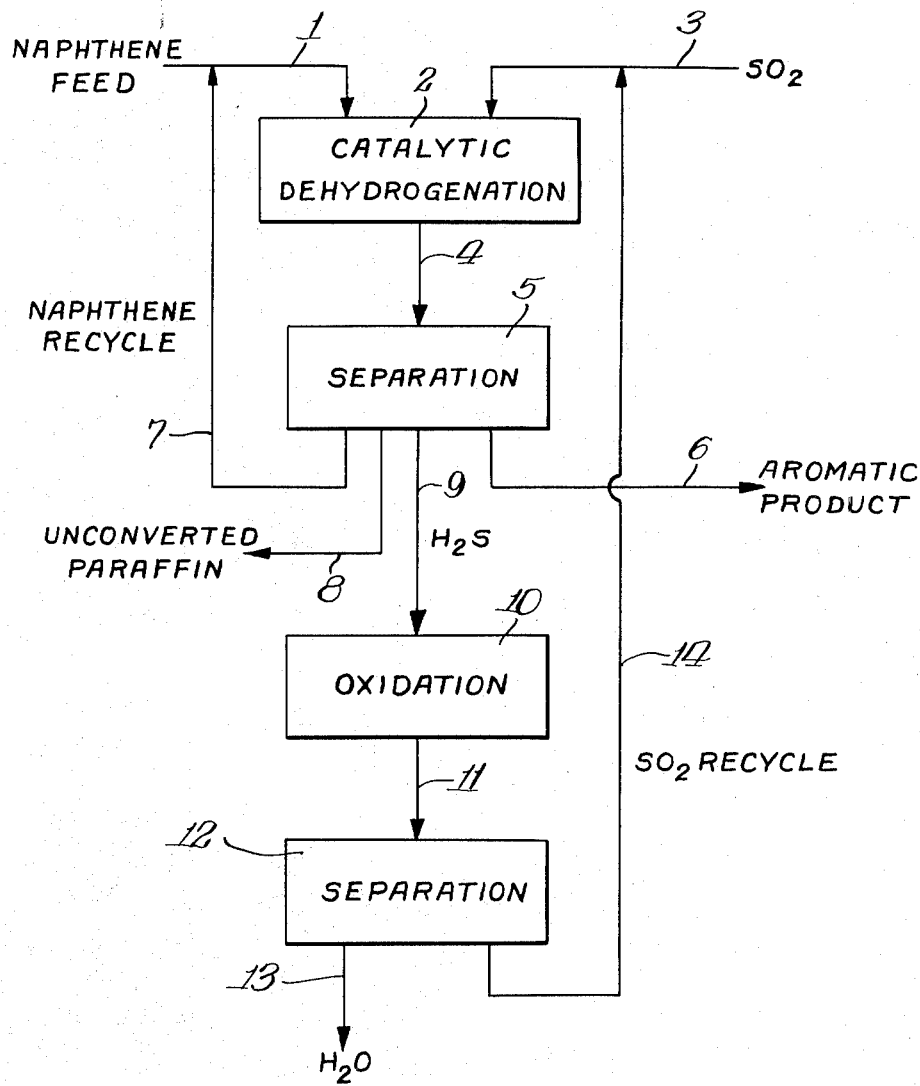

DEHYDROGENATION OF NAPHTHENES BY MEANS OF SULFUR DIOXIDE

Joseph D. Danforth, Grinnell, Iowa, assignor to The Trustees of Iowa College, Grinnell, Iowa Application August 9, 1952, Serial No. 303,470

12 Claims. (Cl. 260—668)

This invention relates to improvements in oxidation-reduction type reactions and more particularly to improvements in catalytic dehydrogenation using a hydrogen acceptor or oxidizing agent.

Dehydrogenation reactions have heretofore been carried out using a wide variety of suitable catalysts dependent upon the nature of the particular reaction involved. The dehydrogenation of naphthene hydrocarbons, particularly naphthene-rich petroleum fractions, is of special interest at the present time because of the great demand for aromatics. It is also well known that in many instances dehydrogenation is facilitated by the presence of a hydrogen acceptor molecule which functions generally as an oxidizing agent and is itself reduced during the reaction. For example, it has been proposed to dehydrogenate higher molecular weight paraffin hydrocarbons in the presence of ethylene which acts as a hydrogen acceptor and is converted to ethane during the reaction.

My invention involves the use of sulfur dioxide as a hydrogen acceptor for carrying out catalytic oxidation-reduction reactions of various types and is particularly useful in the catalytic dehydrogenation of naphthenes to the corresponding aromatics. As will hereinafter appear, sulfur dioxide is highly advantageous as a hydrogen acceptor because it is reduced to hydrogen sulfide which can be easily oxidized to sulfur dioxide for recycling to the process so that there is no net consumption of sulfur.

Accordingly, a primary object of my invention is to provide a novel process for carrying out oxidation-reduction reactions, particularly dehydrogenation reactions, in the presence of a catalyst and a hydrogen acceptor.

A further object of the invention is to provide a novel process for catalytically reacting a hydrocarbon with a hydrogen acceptor whereby hydrogen is removed from the hydrocarbon to form the corresponding oxidized hydrocarbon with concurrent reduction of the hydrogen acceptor.

Another object of the invention is to provide a novel and improved process for the conversion of naphthene hydrocarbons to the corresponding aromatics.

An additional object of the invention is to provide a novel process of the aforementioned character in which the reduction product of the hydrogen acceptor can be readily oxidized and recycled to the process.

Other objects and advantages of the invention will become apparent from the subsequent detailed description, particular reference being made to the accompanying drawing which is a schematic flow diagram illustrating a preferred embodiment of the invention.

In one broad embodiment, my invention relates to the reaction of an oxidizable compound with sulfur dioxide in the presence of a solid catalyst whereby to effect oxidation of said compound with the sulfur dioxide functioning as a hydrogen acceptor and being reduced to hydrogen sulfide. Preferably, the reaction involves the dehydrogenation of a hydrocarbon and the preferred catalyst for the reaction is activated carbon.

In a more specific embodiment, the invention comprises the reaction of a naphthene hydrocarbon with sulfur dioxide in the presence of a solid catalyst whereby to form the corresponding aromatic hydrocarbon.

Although my process is capable to a certain extent of effecting dehydrogenation of other types of compounds, e. g. paraffin hydrocarbons, such as hexane and octane, I have obtained best results in the dehydrogenation of naphthenes including cyclohexane, alkylcyclohexanes, and polycyclic saturated hydrocarbons such as decalin. With such naphthenes I have obtained good yields of the corresponding aromatic hydrocarbons and with very small amounts of gaseous products being formed. A representative reaction can be illustrated with cyclohexane as follows:

$$C_6H_{12} + SO_2 \rightarrow H_2S + 2H_2O + C_6H_6$$

The process is also well adapted for the treatment of naphthenic petroleum fractions to convert the naphthene hydrocarbons contained therein to the corresponding aromatic hydrocarbons. In this connection, the selectivity of the reaction is excellent so that by appropriate control of reaction conditions the invention permits the treatment of paraffin-naphthene fractions to effect preferential dehydrogenation of the naphthene hydrocarbons while conversion of the paraffin hydrocarbons is held to a minimum.

Although activated alumina, silica gel, and various silica-alumina composites are operative in the process, I have found that the most efficient catalyst by far is activated carbon. The reaction of the hydrocarbon charge with sulfur dioxide in the presence of the solid catalyst may be carried out according to any of the conventional contacting techniques well known in the catalytic art. Although the illustrative examples hereinafter presented involve a fixed bed operation wherein the reactants are passed through a reaction vessel containing a fixed supply of catalyst, the invention also contemplates the use of fluid catalyst techniques, moving bed operations, suspensoid methods, etc. During the process the catalyst gradually becomes contaminated with carbonaceous deposits and may be regenerated as required. In the case of the activated carbon catalyst, regeneration can be effected by flash burning, by purging with high temperature steam, or by other suitable techniques. In the case of fluid type operation, regeneration of the activated carbon catalyst may be effected by controlled burning with air.

With respect to the operating conditions for the process, the reactions are carried out generally at a temperature of from about 400° C. to about 600° C., and in the case of the dehydrogenation of naphthenes to aromatics the preferred temperature range is from about 450° C. to about 500° C. I have obtained excellent results at atmospheric pressure, but the process may be carried out at a pressure of from about ¼ atmosphere to about 500 atmospheres. Using a fixed bed type of operation, the liquid hourly space velocity may be from about ½ to about 5 or higher dependent upon the conversion desired.

In order to insure efficient operation of the process, I have found that it is essential to use a mol excess of hydrocarbon over sulfur dioxide for the reason that complete conversion of sulfur dioxide to hydrogen sulfide must be obtained. If excess sulfur dioxide passes through the process unchanged, the hydrogen sulfide formed from the reduced portion of sulfur dioxide reacts with the excess sulfur dioxide to form elemental sulfur. Such reaction between sulfur dioxide and hydrogen sulfide is highly undesirable since it makes efficient operation extremely difficult and results in contamination of the desired reaction products with sulfur. In fact, in laboratory experiments employing a glass receiver for the reaction products from the catalyst zone, it is possible to observe the efficiency of the reaction by reason of the fact that as soon as any sulfur dioxide begins to pass through the reaction zone unchanged, yellow deposits of sulfur can be detected almost immediately in the product receiver thus indicating clearly that the catalyst is inefficient or has become inactive.

However, by charging an excess of hydrocarbon reactant, I am able to obtain conversion of only a portion of the hydrocarbon reactant while at the same time obtaining complete conversion of sulfur dioxide to hydrogen sulfide and water. Consequently, it is essential to the proper operation of the process that the hydrocarbon reactant be present in an amount in excess of that theoretically required for the complete reduction of the sulfur dioxide. Because of the high degree of efficiency of the reaction as carried out with an activated carbon catalyst, I have been able to obtain in a single pass through the reaction zone a liquid product containing 25 to 30 weight per cent aromatics in the case of the conversion of naphthenes to aromatics. Such results have been obtained with less than ⅓ conversion of the naphthene hydrocarbon charged so as to insure a proper mol excess of hydrocarbon. However, it will be understood that under other circumstances it will be possible to operate at even higher single pass conversion levels before incomplete conversion of sulfur dioxide results in the undesirable formation of sulfur.

Because of the fact that the process necessitates the charging of a mol excess of hydrocarbon reactant and the incomplete conversion of the hydrocarbon reactant so charged, it is necessary in the commercial operation of the process to separate the desired reaction products from the unconverted hydrocarbon charge so that the latter can be recycled to the process. In the case of the dehydrogenation of naphthenes to aromatics, the solvent extraction of the liquid reaction products using liquid sulfur dioxide as an extracting agent will be highly convenient inasmuch as it is unnecessary to strip the naphthene residue or raffinate prior to recycling the same.

From a commercial viewpoint, the process is also highly attractive because of the fact that the hydrogen sulfide formed as a result of the reduction of sulfur dioxide can be readily separated and reconverted to sulfur dioxide for recycling to the process so that there is no net consumption of sulfur. Hydrogen sulfide is easily converted to sulfur dioxide by burning in an excess of air. However, low temperature catalytic techniques for the oxidation of hydrogen sulfide to sulfur dioxide may be preferable in many instances.

Referring now to the drawing, I have illustrated therein a schematic flow diagram illustrating a typical sequence of process steps in the conversion of naphthenes to aromatics. Thus, a naphthene-containing feed, such as a petroleum fraction containing hexane and methylcyclohexane, is introduced through a line 1 into a catalytic reaction or dehydrogenation zone 2 containing activated carbon. Gaseous sulfur dioxide is also introduced into the zone 2 through a line 3. The reaction products are withdrawn from the dehydrogenation zone 2 through a line 4 to a separation system indicated at 5. In the zone 5 an aromatic concentrate comprising toluene is separated and recovered through a line 6. An unconverted naphthene fraction is recycled from the separation zone 5 through a line 7 and line 1 to the reaction zone 2. As hereinbefore mentioned, the selectivity of the dehydrogenation reaction is excellent so that only a relatively minor proportion of the hexane in the feed is converted and unconverted paraffin hydrocarbons may, therefore, be removed from the reaction products through a line 8. Because of the role of sulfur dioxide as a hydrogen acceptor, only relatively slight amounts of hydrogen-containing gas are formed in the process.

In order to operate the process with maximum economy, the hydrogen sulfide gas which is formed as a result of the reduction of sulfur dioxide is separated through a line 9 and is subjected to oxidation in a zone 10 to reconvert the same to sulfur dioxide. The resultant oxidation products pass through a line 11 to a separation zone 12 wherein water is removed through a line 13 and sulfur dioxide is recycled through a line 14 to the line 3 and then to the dehydrogenation zone 2.

The following specific examples are presented by way of illustration, but it will be understood that the invention is not limited to these examples. In each example, the reaction involved was carried out using an externally heated reaction tube containing a fixed bed of catalyst. During a run the temperature was measured at the top, middle and bottom of the catalyst bed at regular intervals and the temperature of the run was recorded as the average of these measurements. All runs were made at atmospheric pressure. The hydrocarbon feed was charged to the reaction zone by means of a pump, and sulfur dioxide was admitted to the reaction zone directly from a high pressure cylinder through a control valve. In each case, the liquid hydrocarbon was pumped downwardly through the reaction tube containing the catalyst and shortly after the flow of hydrocarbon was started, the sulfur dioxide flow was begun. The liquid product was collected in an iced receiver and the gaseous products were separated and collected in a gas bottle.

Quantitative estimations of the hydrogen sulfide content of the gaseous product were carried out by bubbling the gas through a solution of iodine of known concentration and subsequently determining the unreacted iodine by back titration with sodium thiosulfate. The olefin content, oxygen content, and molecular weight of the gaseous products were determined by conventional methods. The liquid product from each run was fractionated in most cases using a decalin boiling base and the refractive index and the weight of each fraction was determined. In addition, the olefin and aromatic content of the liquid product was determined by conventional methods.

During a run the successful operation of the catalyst was easily observed. Whenever the catalyst became inactive, deposits of sulfur were noted on the wall of the receiver. Otherwise, a clean liquid product was obtained.

EXAMPLE 1

In order to demonstrate the effectiveness of a catalyst in the reaction, an experiment was made in which 78 grams of cyclohexane was charged together with 0.19 mole of sulfur dioxide over a process period of 60 minutes to the reaction tube containing 75 ml. of glass chips at a temperature of 506° C. Upon completion of the run, 77 grams of liquid product and 0.4 gram of gas had been recovered. The liquid product was saturated with sulfur dioxide and there was no evidence of conversion of cyclohexane to benzene. Furthermore, the gaseous products were bubbled through a solution of cadmium chloride and no precipitate of cadmium sulfide was observed. Consequently, this run gave no evidence of any significant reduction of sulfur dioxide to hydrogen sulfide and water.

EXAMPLE 2

A series of runs was made at various temperatures charging cyclohexane and sulfur dioxide to the reaction tube containing a bed of activated carbon (Columbia Grade S, 4/14 mesh). The results of these runs were as follows:

Table I

|  | | | |
|---|---|---|---|
| Temperature, °C | 499 | 460 | 421 |
| L. H. S. V | 1.33 | 1.33 | 1.40 |
| Duration, min | 120.3 | 120.3 | 114.2 |
| g. Cyclohexane (200 ml.) | 156 | 156 | 156 |
| Total mols $SO_2$ | 0.47 | 0.47 | 0.47 |
| Mols $H_2O$, recovered | 1.04 | 0.98 | 1.02 |
| Mols $H_2S$, recovered | 0.44 | 0.41 | 0.32 |
| Hydrocarbon Recovery, Wt. Percent: | | | |
| Liquid | 92.0 | 90.5 | 91.0 |
| Gas | 1.7 | 0.8 | 0.3 |
| Hydrogen in $H_2O$ and $H_2S$ | 2.0 | 1.9 | 1.7 |
| Loss and coke | 4.3 | 6.8 | 7.0 |
| Composition of liquid product: | | | |
| Wt. Percent olefins | 3.5 | 2.6 | 1.6 |
| Wt. percent aromatics (benzene) | 22.4 | 19.2 | 19.0 |

From the foregoing data it will be seen that in the 421° C. run the quantity of hydrogen sulfide formed was somewhat less than at the higher temperatures indicating a somewhat lower reaction efficiency. In addition, the product in this case appeared to contain a minor quantity of sulfur compounds. However, no sulfur formation was observed in any of these runs.

EXAMPLE 3

In order to demonstrate the effectiveness of sulfur dioxide as a hydrogen acceptor in the reaction, two comparative runs were made charging methylcyclohexane to the activated carbon catalyst. In one run sulfur dioxide was charged along with the methylcyclohexane and in the other run carbon dioxide was used in place of sulfur dioxide. As will be evident from the following results, substantially no toluene was formed in the absence of sulfur dioxide, but the liquid product from the sulfur dioxide run contained an estimated 25 to 28% toluene as determined by fractionation of the liquid product in each case.

Table II

|  | $SO_2$ | $CO_2$ |
|---|---|---|
| Gas charged | | |
| Mols of gas, total | 0.45 | 0.35 |
| g. Methylcyclohexane | 154 | 154 |
| L. H. S. V | 1.39 | 1.62 |
| Temperature, °C | 490 | 485 |
| Duration, minutes | 115 | 99 |
| Mols $H_2O$ recovered | 0.92 | 0 |
| Recovery, wt. percent: | | |
| hydrocarbon | 90.5 | 96.4 |
| gas | 1.5 | 1.9 |
| Hydrogen in $H_2O$ and $H_2S$ | 1.8 | 0 |
| Coke and unaccounted | 6.2 | 1.7 |
| Molecular weight of gas | 6.3 | 8.3 |

EXAMPLE 4

In this run 100 ml. (78 g.) of ethylcyclohexane and 0.26 mol of sulfur dioxide were charged to the activated carbon catalyst for a process period of 57 minutes at a liquid hourly space velocity of 1.41 and a catalyst temperature of 492° C. Hydrocarbon liquid, gas and coke were 90.5, 3.8 and 3.0 weight per cent of the charge, respectively. In addition, 0.59 mol of water were recovered in the liquid product. The molecular weight of the gas was 9.8. Due to equipment limitations, fractionation of the liquid product to obtain a sharp separation between ethylbenzene and ethylcyclohexane was not possible, but a minimum of 17.0 grams of ethylbenzene was recovered. By sulfuric acid absorption methods, it was estimated that the liquid product contained 27.4 weight per cent aromatics.

EXAMPLE 5

In this example decalin (decahydronaphthalene) was reacted with sulfur dioxide in the presence of the activated carbon catalyst to obtain naphthalene. A comparable run was made in which the sulfur dioxide was omitted and it was found that only a relatively minor per cent of naphthalene was obtained as compared with the run in which sulfur dioxide was used. The per cent naphthalene in the liquid product was determined by cooling the liquid product to 0° C., filtering, and drying on a suction filter. The data from these runs were as follows:

Table III

|  | | |
|---|---|---|
| Mols, $SO_2$, charged | 0.24 | 0 |
| g. decalin | 88 | 88 |
| Duration, min | 56 | 52 |
| L. H. S. V | 1.42 | 1.52 |
| Temperature, °C | 489 | 493 |
| Recovery, Mols $H_2O$ | 0.54 | 0 |
| Liquid hydrocarbons, Wt. percent | 92.7 | 97.5 |
| Gas, Wt. percent | 2.3 | 3.0 |
| Coke, Wt. percent | 1.7 | 1.4 |
| Percent crude naphthalene crystallized from liquid hydrocarbon | 32.5 | 4.5 |

EXAMPLE 6

In order to determine whether naphthenes could be selectively dehydrogenated in the presence of paraffins, a run was made in which 200 ml. (149.4 g.) of a mixture containing 22.2 weight per cent n-hexane and 77.8 weight per cent methylcyclohexane was charged together with 0.4 mol of sulfur dioxide to the reaction tube containing 75 ml. of the activated carbon catalyst for a process period of 106 minutes at a temperature of 493° C. A recovery of 0.95 mol of water was obtained and the liquid hydrocarbon product, gas, and coke were 88.8, 2.3, and 2.3 weight per cent of the charge, respectively. By careful fractionation of the liquid hydrocarbon product, it was determined that this product contained 21.4 weight per cent hexane, 56.1 weight per cent methylcyclohexane, and 22.5 weight per cent toluene. From the distillation data it was further calculated that the reaction product contained 29.8 grams of n-hexane as compared with 33.2 grams of n-hexane in the original feed. Similarly, it was calculated that the toluene recovered amounted to 0.34 mol as compared with a theoretical yield of 0.40 mol assuming that all of the sulfur dioxide reacted to form toluene. These data clearly indicate that cyclohexane rings can be selectively dehydrogenated in the presence of paraffins.

EXAMPLE 7

In order to demonstrate the broad principles involved in the reaction, various paraffin hydrocarbons were reacted with sulfur dioxide in the presence of the activated carbon catalyst. Generally speaking, the reaction of paraffins and sulfur dioxide results in a more rapid inactivation of the catalyst and excessive formation of paraffin gases apparently by cracking of the olefins formed from paraffin dehydrogenation. In each case, the activity of the catalyst was depleted rather quickly with the result that elemental sulfur was soon formed in the receiving flask by the reaction of unconverted sulfur dioxide with hydrogen sulfide and thereby interfering with proper recovery and analysis of the reaction products.

In a typical instance, n-hexane was charged to the catalyst and the resultant liquid product contained 22.3 weight per cent olefins. The data from this run were as follows:

Table IV

|  |  |
|---|---|
| Temperature, °C | 496 |
| Duration, min | 45 |
| G. hydrocarbon charged | 68 |
| Total mols $SO_2$ | 0.16 |
| Weight per cent: | |
| Liquid | 70.0 |
| Gas | 8.7 |
| Coke | 9.0 |
| Weight per cent olefins in liquid | 22.3 |
| Gas composition, isobutylene | 0.2 |
| Other olefins | 14.6 |
| paraffins (resid.) | 85.2 |
| Mol. wt. of gas | 34.8 |

EXAMPLE 8

Although activated carbon gave the best results of the various catalysts tested, it was found that other solid catalysts are also capable of promoting oxidation and dehydrogenation reactions in the presence of sulfur dioxide but their efficiency was less and the catalyst activity was rapidly depleted. The following data obtained with activated alumina when charging methylcyclohexane and sulfur dioxide show that the methylcyclohexane was definitely converted to toluene.

Table V

| | |
|---|---|
| Temperature, °C | 498 |
| L. H. S. V. | 1.32 |
| Duration, min | 121 |
| Methylcyclohexane charged: | |
| Grams | 154 |
| Mols | 1.57 |
| Sulfur dioxide, total mols | 0.48 |
| Mols H₂O, recovered | 0.95 |
| Hydrocarbon recovery, weight per cent: | |
| Gas | 0.5 |
| Liquid | 88.0 |
| Coke on cat | 4.1 |

The liquid product appeared to contain traces of sulfur compounds and the distillation data indicated that it consisted of 5 to 10% toluene. Consequently, activated alumina clearly effects conversion of naphthenes to the corresponding aromatics but with less efficiency than activated carbon.

I claim:

1. A process for the production of aromatic hydrocarbons which comprises reacting a naphthene hydrocarbon with sulfur dioxide in the presence of a catalyst consisting essentially of activated carbon at a temperature of from 440° C. to about 600° C. and a pressure of from about ¼ atmosphere to about 500 atmospheres, said naphthene hydrocarbon being present in mol excess over the sulfur dioxide in order to prevent formation of sulfur.

2. The process of claim 1 wherein said temperature is from about 450° C. to about 500° C.

3. A process for the production of benzene which comprises reacting cyclohexane with sulfur dioxide in the presence of a catalyst consisting essentially of activated carbon at a temperature of from about 400° C. to about 600° C. and a pressure of from about ¼ atmosphere to about 500 atmospheres, and maintaining a sufficient mol excess of cyclohexane over sulfur dioxide to prevent formation of sulfur.

4. A process for the production of toluene which comprises reacting methylcyclohexane with sulfur dioxide in the presence of a catalyst consisting essentially of activated carbon at a temperature of from about 400° C. to about 600° C. and a pressure of from about ¼ atmosphere to about 500 atmospheres, and maintaining a sufficient mol excess of methylcyclohexane over sulfur dioxide to prevent formation of sulfur.

5. A process for the production of ethylbenzene which comprises reacting ethylcyclohexane with sulfur dioxide in the presence of a catalyst consisting essentially of activated carbon at a temperature of from about 400° C. to about 600° C. and a pressure of from about ¼ atmosphere to about 500 atmospheres, and maintaining a sufficient mol excess of ethylcyclohexane over sulfur dioxide to prevent formation of sulfur.

6. A process for the production of naphthalene which comprises reacting decalin with sulfur dioxide in the presence of a catalyst consisting essentially of activated carbon at a temperature of from about 400° C. to about 600° C. and a pressure of from about ¼ atmosphere to about 500 atmospheres, and maintaining a sufficient mol excess of decalin over sulfur dioxide to prevent formation of sulfur.

7. A process for the production of aromatic hydrocarbons which comprises reacting a naphthene-containing petroleum fraction with sulfur dioxide in the presence of a catalyst consisting essentially of activated carbon at a temperature of from about 400° C. to about 600° C. and a pressure of from about ¼ atmosphere to about 500 atmospheres while maintaining a sufficient mol excess of naphthene over sulfur dioxide to prevent sulfur formation, and recovering aromatic hydrocarbons from the resultant reaction products.

8. A process for the production of aromatic hydrocarbons which comprises reacting a naphthene-containing petroleum fraction with sulfur dioxide in the presence of a catalyst consisting essentially of activated carbon at a temperature of from about 400° C. to about 600° C. and a pressure of from about ¼ atmosphere to about 500 atmospheres, the naphthene hydrocarbon content of said fraction being in mol excess over the sulfur dioxide whereby to prevent formation of sulfur.

9. A process for the production of aromatic hydrocarbons from petroleum fractions which comprises reacting a petroleum fraction containing naphthene and paraffin hydrocarbons with sulfur dioxide in the presence of a catalyst consisting essentially of activated carbon at a temperature of from about 400° C. to about 600° C. and a pressure of from about ¼ atmosphere to about 500 atmospheres while maintaining a sufficient mol excess of naphthene over sulfur dioxide to prevent sulfur formation whereby to effect selective dehydrogenation of said naphthene hydrocarbons without substantial conversion of said paraffin hydrocarbons, and recovering aromatic hydrocarbons.

10. The process of claim 9 further characterized in that said petroleum fraction contains methylcyclohexane and hexane.

11. A dehydrogenation process which comprises reacting a naphthene hydrocarbon with sulfur dioxide in the presence of a catalyst consisting essentially of activated carbon at a temperature of from about 400° C. to about 600° C. and a pressure of from about ¼ atmosphere to about 500 atmospheres while maintaining a sufficient mol excess of naphthene over sulfur dioxide to prevent sulfur formation whereby to effect dehydrogenation of the naphthene hydrocarbon to the corresponding aromatic hydrocarbon and whereby said sulfur dioxide is converted to hydrogen sulfide, recovering the aromatic hydrocarbon formed in the dehydrogenation step, subjecting the hydrogen sulfide formed in the dehydrogenation step to oxidation whereby to form sulfur dioxide, and recycling sulfur dioxide from the oxidation step to the dehydrogenation step.

12. A dehydrogenation process which comprises contacting sulfur dioxide and a petroleum fraction containing naphthene and paraffin hydrocarbons with a catalyst consisting essentially of activated carbon at a temperature of from about 400° C. to about 600° C. and a pressure of from about ¼ atmosphere to about 500 atmospheres while maintaining a sufficient mol excess of naphthene over sulfur dioxide to prevent sulfur formation whereby to effect dehydrogenation of the naphthene hydrocarbon and reduction of sulfur dioxide to hydrogen sulfide, recovering an aromatic hydrocarbon, separating unconverted naphthene and recycling the same to the dehydrogenation step, subjecting said hydrogen sulfide to oxidation to form sulfur dioxide, and recycling sulfur dioxide from the oxidation step to the dehydrogenation step.

References Cited in the file of this patent

UNITED STATES PATENTS

| | | |
|---|---|---|
| 2,126,817 | Rosen | Aug. 16, 1938 |
| 2,626,286 | Voorhies, Jr. et al. | Jan. 20, 1953 |

OTHER REFERENCES

Elder et al.: Textbook of Chemistry, revised edition, pages 368, 369 (2 pages), (1948), published by Harper & Brothers, New York.